Nov. 22, 1966 J. A. SVERECKIS ETAL 3,286,758
TIRE CONSTRUCTION
Filed March 24, 1965 2 Sheets-Sheet 1

INVENTORS
JONAS A. SVERECKIS
JOSEPH G. MANCHETTI
HERBERT B. HINDIN
BY
Jack Rosin
ATTORNEY.

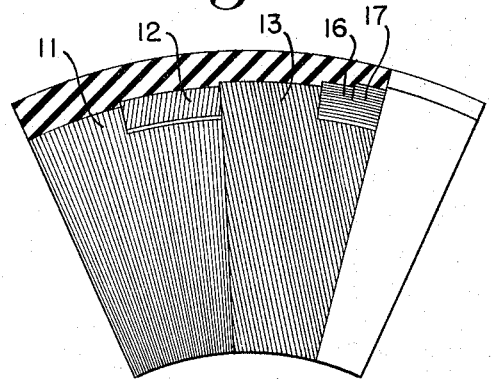
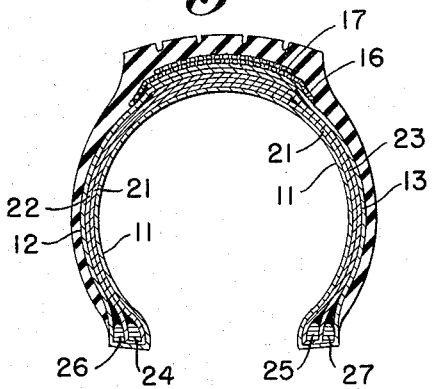
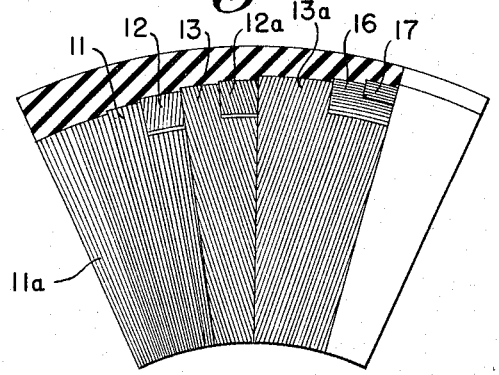
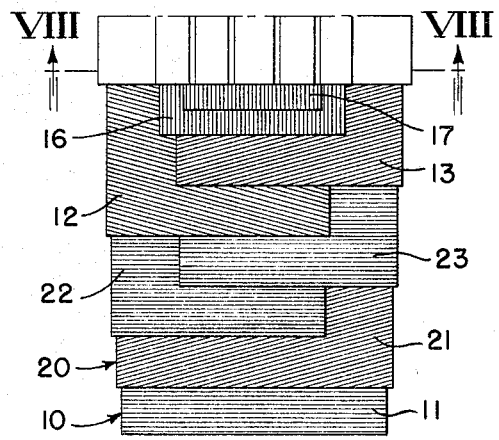
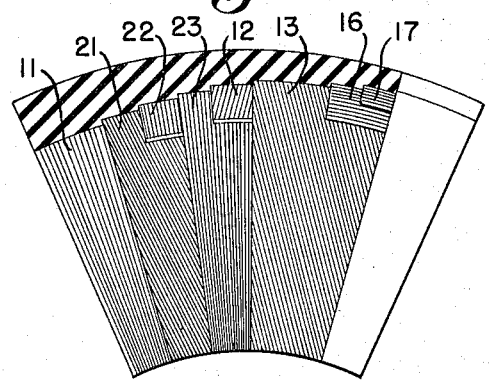

United States Patent Office 3,286,758
Patented Nov. 22, 1966

3,286,758
TIRE CONSTRUCTION
Jonas A. Svereckis, Detroit, and Joseph G. Manchetti, St. Clair Shores, Mich., and Herbert B. Hindin, Hinsdale, Ill., assignors to United States Rubber Company, New York, N.Y., a corporation of New Jersey
Filed Mar. 24, 1965, Ser. No. 442,440
7 Claims. (Cl. 152—356)

This invention relates to radial ply pneumatic tires, and, more particularly, to low aspect ratio radial ply pneumatic tires (e.g., aircraft tires, low profile tires). As used herein, the term "aspect ratio" has reference to the relationship of the cross-sectional height of a tire to its cross-sectional width. A tire having a relatively low cross-sectional height and a high cross-sectional width is referred to as a low aspect ratio tire. Alternatively, the term "low section height" may be used to denote a low aspect ratio tire.

In the conventional manufacture of radial ply tires having a high aspect ratio, a single or several plies are turned up around the beads with the ply edges terminating in the region between the beads and the maximum cross-sectional width of the tire. When similar constructional practices are employed with low aspect ratio tires, the ply ends terminate at, or outwardly of, the point of maximum tire cross-sectional width, in a high flexing region of the tire. This construction is not entirely satisfactory due to the fact that with the ply ends located in the high flex region of the tire, there is a tendency toward separation of the turned up portion of the ply from the body of the ply, causing premature failure of the tire.

In order to overcome the foregoing problem, low aspect ratio radial ply tires have been made involving a crown lap splice. In this type of tire a radial ply of approximately double width is turned up in such a manner that its ply ends overlap and terminate in the crown area of the tire, thereby forming two radial plies in the tire. Testing of such crown lap splice radial ply tires revealed that, although improved low speed performance was obtained, these tires were of limited use in high speed operation. The reason for this is that excessive shear develops between the two radial sidewall plies during high speed operation and causes ply separation at points above the beads, where the two plies are separated by an apex strip. After considerable experimentation, it was discovered that the high speed life of low section height, crown lap splice radial ply tires could be appreciably improved, in accordance with the present invention, through the use of a construction that is herein termed a "differential angle" construction. In a differential angle construction, a wide sheet of fabric is laid on a tire building drum in the radial direction, at 90° angles to a plane perpendicular to the axis of the drum, and then turned up at an angle substantially less than 90°, in the range of 70° to 80°, preferably 75°. In the cured tire the angle range in the turned up portion is from 65° to 75°; however, building angles, rather than cured tire angles, will be referred to herein, it being understood that these angles change slightly during shaping and vulcanization. The above "differential angle" construction provides for a better distribution of tensions between the inner and outer plies of a tire, and results in an improved, longer lasting tire.

Accordingly, one object of this invention is an improved pneumatic tire.

Another object of this invention is an improved low section height, radial ply pneumatic tire.

An additional object of this invention is a low section height, multi-ply pneumatic tire, employing crown lap splice-differential angle construction, with at least one of the plies having radially disposed cords therein.

Further objects and advantages of this invention will become apparent as the following description proceeds.

Briefly stated, and in accordance with one embodiment of this invention, the improved pneumatic tire includes axially spaced bead rings and comprises at least two plies of rubber covered cord material formed from a single length of the material which extends between and is folded over the bead rings of the tire, the end portions of the material being directed back toward and overlapping one another in the crown portion of the tire, the cords of one of the plies being radially disposed in the tire and the cords of the other of the plies crossing the cords of the radial ply by an angle of from 10° to 20°.

While the specification concludes with claims particularly pointing out and distinctly claiming the subject matter regarded as the invention herein, it is believed that the invention will be better understood from the following description taken in connection with the accompanying drawings in which:

FIG. 7 is a cut away plan view of still another tire tread, showing the construction resulting from combining the fabrics of FIG. 1 and FIG. 2;

FIG. 8 is a cross-sectional view taken on line VIII—VIII of FIG. 7;

FIG. 9 is a cut away elevational view of the tire shown in FIGS. 3 and 4;

FIG. 10 is a cut away elevational view of the tire shown in FIGS. 5 and 6; and

FIG. 11 is a cut away elevational view of the tire shown in FIGS. 7 and 8.

Figure 1:
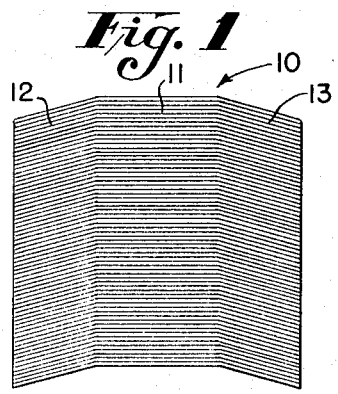
FIG. 1 is a plan view of a piece of tire fabric used in practicing one form of the invention.

Referring to FIG. 1 of the drawings, a wide piece or layer of rubber coated cord fabric is shown generally at 10. This fabric (the cords of which may be of steel, glass, nylon, or the like) is employed in building tires of the preferred embodiment, illustrated in FIGS. 3, 4 and 9. Fabric layer 10 is provided with a center portion 11 having cords therein disposed at 90° to the side edges of the fabric for use in the construction of radial ply tires. The edge portions 12 and 13 of fabric layer 10 are shifted or "angle racked" relative to the central portion 11 so that the cords thereof are at an angle of 10° to 20° to the cords of the central portion 11. Mechanism for angle racking or changing the angle of a portion of the fabric with respect to the remainder of the fabric has been illustrated in U.S. Patent No. 2,700,998 to E. H. Wallace, which patent is assigned to the assignee of the present invention. Such mechanism forms no part of the present invention and therefore will not be described in detail herein.

Figure 3:
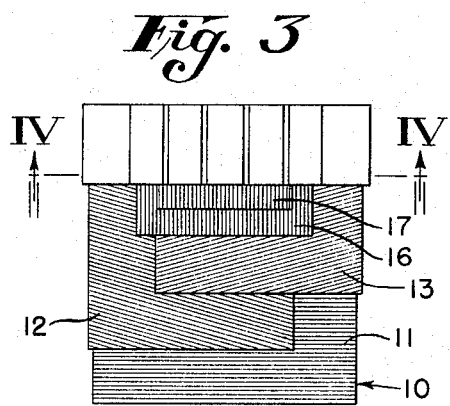
FIG. 3 is a cut away plan view of a tire tread, showing the ply construction resulting from the use of the FIG. 1 fabric.
Figure 4:
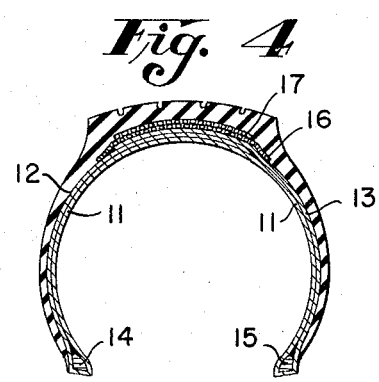
FIG. 4 is a cross-sectional view taken on line IV—IV of FIG. 3.

Referring to FIG. 1 in conjunction with FIGS. 3, 4 and 9, the end portions 12 and 13 of layer 10 are angle racked in the same direction so that each of these portions, which together represent the second ply, form a 10° to 20° angle with the central portion 11, or first ply, and the end portions 12 and 13 form a 20° to 40° angle with respect to one another where they overlap in the crown of the tire. Conventional bead rings or bundles 14 and 15 and two circumferential breakers 16 and 17 are employed in the preferred embodiment of this invention.

One procedure for fabricating a tire carcass in accordance with the present invention is as follows. A fabric layer 10 is provided, having a central portion 11 of sufficient width to extend from bead ring 14 to bead ring 15 and having enough excess material in end portions 12 and 13 for these portions to extend from bead rings 14 and 15, respectively, to the opposite shoulder regions of the tire. Fabric layer 10 is laid on a conventional tire building drum with the cords of central portion 11 making an angle of 90° to a plane perpendicular to the axis of the drum. The edge portions 12 and 13 are then turned down to provide bead setting shoulders and the bead rings 14 and 15, are placed against these shoulders. The edge portions 12 and 13 are then turned up while still maintained at 90° angles. When the turn ups reach the top of the bead rings 14 and 15 the edge portions are shifted from 90° to lesser angles of from 70° to 80°, preferably 75°, and then overlapped in the crown. After this, breakers 16 and 17 are added, and the tire is finished off in a conventional manner. An alternative procedure for fabricating the tire carcasses involves angle racking the edge portions of fabric layer 10 before winding it on the building drum. This may be done by utilizing the angle racking mechanism of the aforementioned U.S. Patent 2,700,998.

Figure 5:
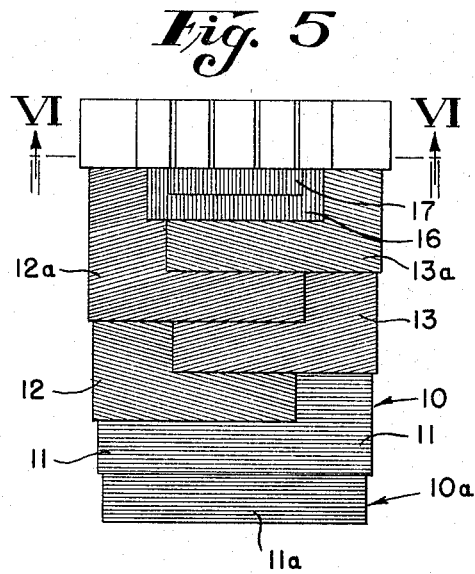
FIG. 5 is a cut away plan view of another tire tread, showing the ply construction resulting from using two pieces of the fabric shown in FIG. 1.
Figure 6:
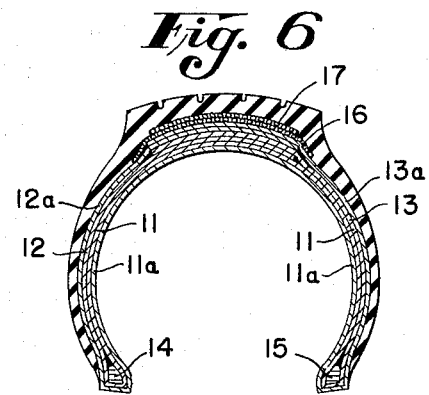
FIG. 6 is a cross-sectional view taken on the line VI—VI of FIG. 5.

When it is desired to construct a stronger carcass involving the use of two fabric layers 10, the construction shown in FIGS. 5, 6 and 10 may be utilized. In this construction the second fabric layer 10a is rotated 180° from the position shown in FIG. 1 before it is laminated to the first layer 10. As a result of this, referring to FIG. 5, the first and second central portions 11a and 11, which, respectively, form plies 1 and 2 of the tire, are radial; the end portions 12 and 13, which form the third ply of the tire, cross the second ply at equal but opposite angles of from 10° to 20°; and the end portions 12a and 13a, which form the fourth ply of the tire, cross the end portions 12 and 13 at angles of from 20° to 40°. As before, circumferential breakers 16 and 17 and bead rings 14 and 15 are employed.

Figure 2:
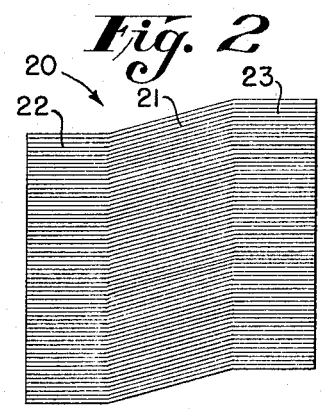
FIG. 2 is a plan view of another piece of tire fabric for practicing other forms of the invention.

A third embodiment of the present invention is shown in FIGS. 7, 8 and 11. This embodiment employs the fabric layer 10 of FIG. 1 in conjunction with a fabric layer 20, shown generally in FIG. 2. Fabric layer 20 is arranged in such a manner that the cords of the central portion 21 thereof make an angle of from 10° to 20°, preferably 15°, to the cords of the end portions 22 and 23 thereof, and the cords of the end portions 22 and 23 make an angle of 90° to the side edges of fabric layer 20. The combination of the fabric layer 20 of FIG. 2 with the fabric layer 10 of FIG. 1 is especially useful when multiple bead rings are to be incorporated at each end of a tire, although satisfactory tires with single bead rings at each end may also be made employing a combination of fabric layer 20 and fabric layer 10. As illustrated in FIGS. 7, 8 and 11, fabric layer 20 is folded about bead rings 24 and 25 so that end portions 22 and 23 overlap in the crown portion of the tire and are radially disposed therein, the central portion 21 of fabric layer 20 being disposed at an angle of 70° to 80° to a plane perpendicular to the axis of the tire. Fabric layer 10 is folded about not only bead rings 24 and 25 but also bead rings 26 and 27. In this case, however, central portion 11 is radially disposed in the tire and end portions 12 and 13 are angularly disposed in the tire. As in the aforementioned embodiments breakers 16 and 17 are employed to circumferentially constrict the tire.

The above described embodiments of tires employing crown lap splice-differential cord angle construction can be used in both automobile and aircraft tires. The crown lap splice-differential cord angle construction provides improved lateral stability in low aspect ratio radial ply tires and aids greatly in equalizing cord loading from ply to ply during flexing of the tires, thereby insuring longer life at high speed operation.

While particular embodiments of this invention have been shown and described, it will be obvious to those skilled in the art that various other changes and modifications may be made without departing from the invention in its broader aspects, and it is, therefore, aimed in the appended claims to cover all such changes and modifications as fall within the true spirit and scope of this invention.

Having thus described the invention, what is claimed as new and desired to be protected by Letters Patent is:

1. A high speed, low aspect ratio pneumatic tire including axially spaced bead rings and having at least two plies of cord material, said two plies comprising a single length of material extending between and folded over said bead rings and having its end portions overlapping one another in the crown portion of the tire, the cords of one of said plies being radially disposed in the tire, the cords of the other of said plies crossing the cords of said one ply throughout at least the sidewalls of the tire by an angle of from 10° to 20°.

2. A tire as in claim 1 wherein the cords of the inner ply are radially disposed and the cords of the outer ply cross the cords of said inner ply at said angle of from 10° to 20°.

3. A tire as in claim 1 wherein the overlapped end portions of the material terminate adjacent the shoulders of the tire opposite from the respective bead rings about which they are folded.

4. A tire as in claim 1 wherein the crossing angle of the cords of one of said lapping end portions relative to the cords of the other of said lapping end portions is from 20° to 40°.

5. A tire as in claim 1 and further including two additional plies of cord material, said two additional plies comprising a single length of material surrounding said first mentioned two plies and having end portions overlapping one another in the crown portion of the tire, the cords of one of said two additional plies being radially disposed in the tire, the cords of the other of said two additional plies crossing relative to the cords of said one additional ply by an angle of from 10° to 20°.

6. A tire as in claim 5 wherein the cords of the two innermost plies of said tire are parallel to one another, and the cords of the two outermost plies of said tire cross relative to one another by an angle of from 20° to 40°.

7. A tire as in claim 5 wherein the crossing angles of the cords of each ply in the tire relative to the cords of each next adjacent ply therein is from 10° to 20°.

References Cited by the Examiner

UNITED STATES PATENTS

| | | | |
|---|---|---|---|
| 1,194,388 | 8/1916 | Ives | 152—356 X |
| 1,579,817 | 4/1926 | Keith | 152—356 |
| 2,700,998 | 2/1955 | Wallace | 152—356 |
| 3,205,931 | 9/1965 | Keefe | 152—361 |

FOREIGN PATENTS 975,379  11/1961  Germany.

References Cited by the Applicant

UNITED STATES PATENTS

| | | |
|---|---|---|
| 1,374,505 | 4/1921 | Hopkinson. |
| 1,493,674 | 5/1924 | Hopkinson. |
| 2,432,630 | 12/1947 | Purdy. |
| 2,493,614 | 1/1950 | Bourdon. |
| 2,703,128 | 3/1955 | Darrow. |
| 2,703,132 | 3/1955 | Darrow. |
| 2,953,183 | 9/1960 | Frohlich et al. |
| 2,976,905 | 3/1961 | Beckadolph. |

ARTHUR L. LA POINT, *Primary Examiner.*

C. HAEFELE, *Assistant Examiner.*